(No Model.)
J. A. STONE.
DRIVE CHAIN.
No. 470,718. Patented Mar. 15, 1892.
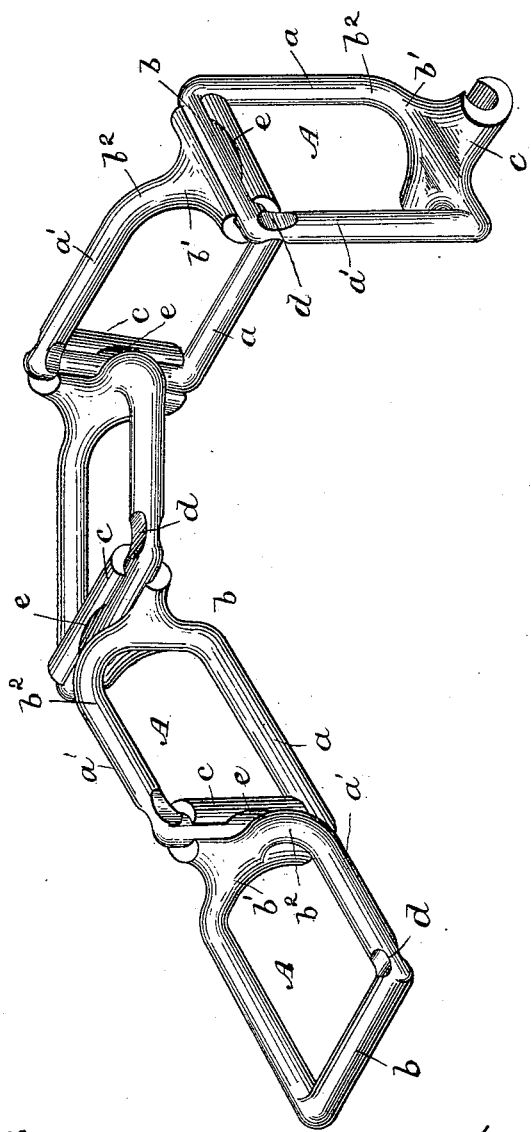
Witnesses.
Arthur Johnson
N. R. Kennedy.
Inventor:
J. A. Stone
By Phil. T. Dodge
Atty

UNITED STATES PATENT OFFICE.

JOHN A. STONE, OF CHICAGO, ILLINOIS, ASSIGNOR TO WILLIAM DEERING, OF SAME PLACE.

DRIVE-CHAIN.

SPECIFICATION forming part of Letters Patent No. 470,718, dated March 15, 1892.

Application filed November 13, 1888. Serial No. 290,703. (No model.)

*To all whom it may concern:*

Be it known that I, JOHN A. STONE, of Chicago, in the county of Cook and State of Illinois, have invented certain new and useful Improvements in Drive-Chains, of which the following is a full description, reference being had to the accompanying drawing.

The object of my invention is to provide a chain that will bend in any desired direction of movement—that is to say, that can be driven by and drive sprocket-wheels rotating in different planes.

In my present construction the links are constructed in duplicate, each with a cylindrical cross-bar at one end and with a hook at the opposite end at right angles to the cross-bar, so that the hooked end of one link may be directly connected to the end of the next link. This construction is intended to dispense with the necessity for the intermediate coupling between the links, as represented in my two applications pending concurrently herewith and now patented, Nos. 393,490 and 393,491, dated November 27, 1888.

Referring to the present invention as represented in the annexed drawing, which is a perspective view of said chain, A is the link, provided with the side bar $a$ and $a'$ and the cylindrical end bar $b$ and the end bar $b'$, provided with a hook $c$. Said end bar $a'$ is flattened at a point contiguous to the end bar $b$, as at $d$. The hook $c$ of one link should as nearly encircle the end bar $b$ as possible, and it is made so to do, the flattening of the side bar being sufficient to permit the slot of the hook to pass over it. This is a well-known form by which attachment may be accomplished; but I do not limit myself to its use in my chain, because it is obvious that any of the well-known means of attaching may be substituted.

In order to have the hook encircle the end bar as much as possible and yet be detachable, I provide the recesses $e$ of such length that as the flattened portion of the side bar is passed within the slot the end bar $a'$ cannot come in contact with any corner bend, as $b^2$, of an adjoining link, and thus be obstructed from further movement. The flattened portion $d$ may fall into the recesses $e$, and thus the said bar moved out of contact with the bend $b^2$ and permitted to pass it. By cutting away the corner of the link, as at $b^3$, the adjacent link may be folded over farther, and yet escape contact with it in passing out, and hence the recess $e$ may be shallower and the hook may be turned far around the end bar. Considering the link as a plane, the hook, as shown, is at right angles thereto; but it may be placed at a much lesser angle, as required for any special work—that is, so as to run properly on any two or more sprocket-wheels the planes of rotation of which are established.

What I claim as my invention, and desire to secure by Letters Patent, is—

1. The chain composed of duplicate links directly connected end to end, each link having at one end a cylindrical cross-bar and at the opposite end a transverse hook, the axis of the bar and hook arranged in planes at approximately right angles to each other.

2. The improved chain-link formed in one piece of rectangular form with an open center, the cylindrical cross-bar at one end, and a hook at the opposite end, said hook and cross-bar having their longitudinal axes at substantially right angles to each other.

3. The drive-chain link having at one end the hook standing transversely to the plane of the link and having the rounded corner $b^2$.

4. The drive-chain link having the rounded corner $b$ and the transversely-arranged hook $c$, with the central depression $e$, as and for the purpose described.

JOHN A. STONE.

Witnesses:
A. L. UPTON,
ARTHUR JOHNSON.